No. 762,480. Patented June 14, 1904.

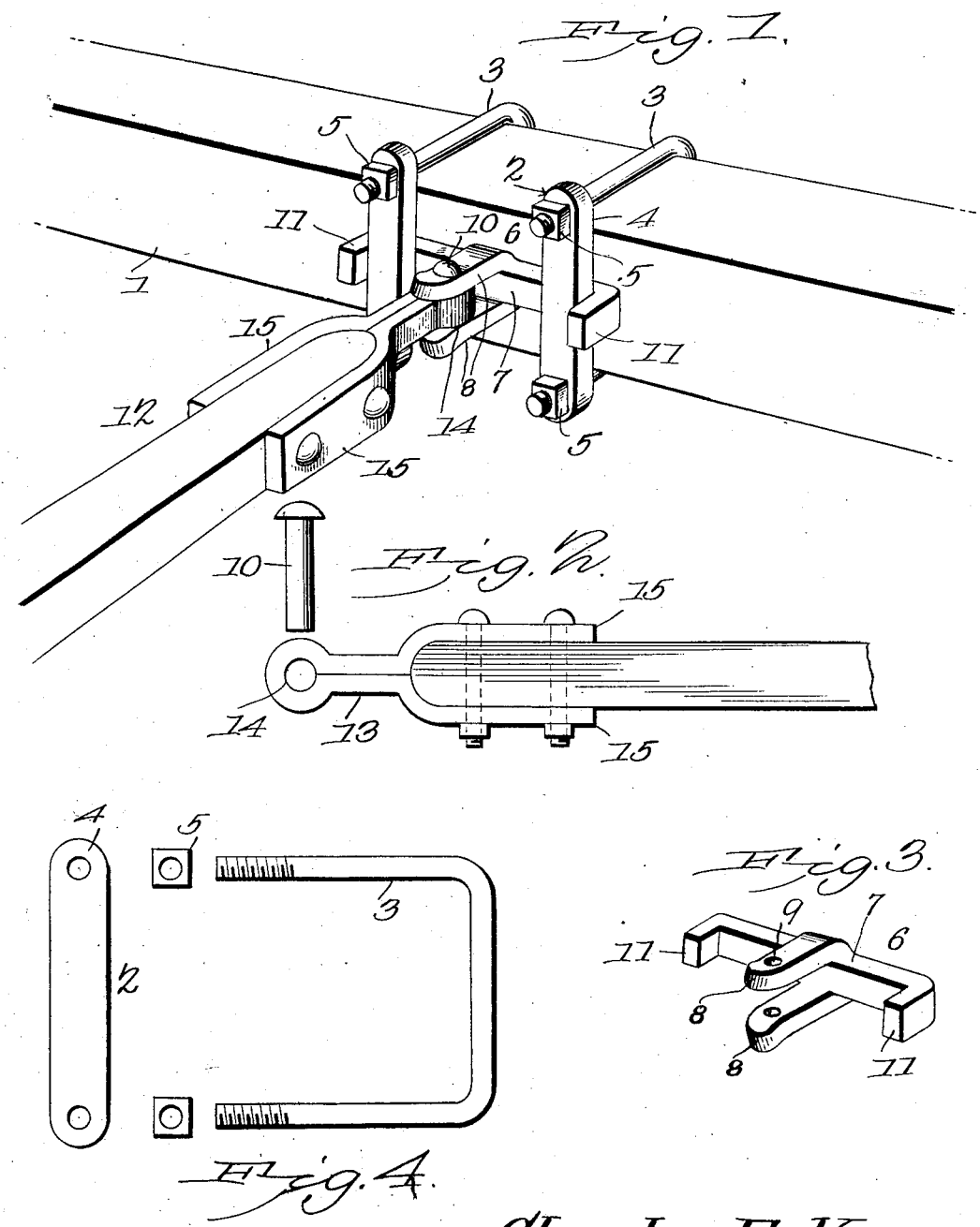

UNITED STATES PATENT OFFICE.

CHARLES EARNEST KEENE, OF ASPERMOUNT, TEXAS.

WAGON-COUPLING.

SPECIFICATION forming part of Letters Patent No. 762,480, dated June 14, 1904.

Application filed October 31, 1903. Serial No. 179,322. (No model.)

*To all whom it may concern:*

Be it known that I, CHARLES EARNEST KEENE, a citizen of the United States, residing at Aspermount, in the county of Stonewall and State of Texas, have invented a new and useful Wagon-Coupling, of which the following is a specification.

My invention relates to wagon-couplings, and has for its objects to produce a comparatively simple and inexpensive device of this character whereby a plurality of vehicles may be readily coupled together in tandem for transportation and one in which the vehicles will when so coupled be suitably spaced and maintained in proper spaced relation.

To these ends the invention comprises the novel details of construction and combination of parts more fully hereinafter described.

In the accompanying drawings, Figure 1 is a perspective view of a portion of a vehicle-axle having my invention applied thereto. Fig. 2 is a plan view of the forward portion of the vehicle-pole carrying one of the coupling members. Fig. 3 is a perspective view of the other coupling member. Fig. 4 is a detail view of one of the clips by which the latter member is attached to the axle.

Referring to the drawings, 1 designates the rear axle of a vehicle of the usual or any preferred construction, and 2 a pair of attaching members engaged with the axle. The attaching members 2 each preferably consists of a U-shaped clamp-bolt 3, which embraces the axle, and a connecting or clamping plate 4, which is disposed between and perforated adjacent to its ends to receive the ends of the bolt 3, the plate being seated upon the rear face of the axle and maintained in position by clamping-nuts 5, tapped onto the ends of the bolt 3.

6 indicates the primary coupling member, comprising, preferably, a base plate or section 7 and a pair of arms or members 8, formed integral with and extending horizontally outward at right angles from the base-plate. These arms, which are spaced vertically one above the other, are provided adjacent to their outer ends with registering perforations 9, adapted for the reception of a coupling pin or device 10. The member 6 is in practice secured in place by engaging its plate 7 beneath the clamping-plates 4, which serve to clamp the member firmly against the rear face of the axle, the terminals of the plate 7 being provided with outturned flanges 11, designed to engage the outer edges of the clamping-plates 4, whereby displacement of the member 6 is obviated.

12 indicates a connecting element extending between the vehicles and preferably consisting of the usual tongue or pole, which, however, carries in the present instance the secondary coupling member 13, preferably in the form of a length of strap metal bent to form an eye 14 and a pair of arms 15, which lie upon opposite sides of the pole and are attached to the latter by bolts or otherwise.

In practice the coupling member 13 is entered between the arms or members 8 until the opening 14 is brought into register with the openings 9, when the pin is inserted through them, thus locking the parts in coupled engagement, as will be readily understood.

From the foregoing it will be seen that the device is of simple construction and may be readily and inexpensively applied to the vehicles and that the latter will when coupled be maintained in proper spaced relation to prevent one vehicle running against the other. In attaining these ends I do not limit myself to the precise details herein set forth, inasmuch as minor changes may be made therein without departing from the spirit of the invention.

Having thus described my invention, what I claim is—

1. In a device of the class described, the combination with the rear axle of a vehicle, of a coupling member, means for attaching the same to the axle, a connecting element arranged to project rearward from the axle, a coupling member carried by said element, and means for locking said members in coupled engagement.

2. In a device of the class described, the combination with the rear axle of a vehicle, of a primary coupling member having a pair of spaced arms, means for attaching the member to the axle, a connecting element arranged to project rearward from the axle, a secondary coupling member carried by said element and designed for entrance between the arms, and a device engaging said members to lock them in coupled engagement.

3. In a device of the class described, the combination with the rear axle of a vehicle, of a primary coupling member comprising a base-plate and a pair of spaced arms, means for attaching the member to the axle, a connecting element arranged to project rearward from the axle, a secondary coupling member carried by said element and designed for entrance between the arms, and a device engaging said members to lock them in coupled engagement.

4. In a device of the class described, the combination with a vehicle-axle, of a primary coupling member comprising a base-plate and a pair of spaced arms, clamping-plates overlying the base-plate, clamping-bolts engaging the axle and receiving the clamping-plates, a connecting element, a secondary coupling member carried thereby and designed for entrance between the arms, and a device engaging said members to lock them in coupled engagement.

5. In a device of the class described, the combination with a vehicle-axle, of clamping-bolts engaging the same, clamping-plates carried by the bolts, a primary coupling member comprising a base-plate seated beneath the clamping-plates and a pair of spaced arms, the ends of the plate being provided with flanges engaging the edges of the clamping-plates, a connecting element, a secondary coupling member carried thereby and designed for entrance between the arms, said member and arms being provided with registering openings, and a coupling-pin engaging said openings for locking the members in coupled engagement.

In testimony that I claim the foregoing as my own I have hereto affixed my signature in the presence of two witnesses.

CHARLES EARNEST KEENE.

Witnesses:
F. L. BUSEY,
R. M. REED.